United States Patent Office 2,986,569
Patented May 30, 1961

2,986,569
2,3-EPOXYPROPYL ETHERS OF ACETYLENIC ALCOHOLS

Roger F. Monroe and Arthur W. Anderson, Midland, Mich., assignors to The Dow Chemical Company, Midland, Mich., a corporation of Delaware No Drawing. Filed Mar. 3, 1958, Ser. No. 718,470

5 Claims. (Cl. 260—348)

The present invention relates to epoxylated ethers of acetylenic alcohols and is more particularly concerned with 2,3-epoxypropyl ethers of acetylenic alcohols having the formula

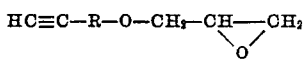

wherein R represents a bivalent saturated hydrocarbon radical containing from 1 to 8 carbon atoms, inclusive, six of which may be joined together to form a ring. The new compounds have been tested and found to be useful as the active ingredient in compositions employed in the control of many species of undesirable vegetation.

The compounds of the present invention conveniently may be prepared by reacting a 2-hydroxy-3-chloropropyl ether of an acetylenic alcohol (prepared in accordance with our copending application Serial No. 718,473 filed even date herewith now Patent No. 2,946,825) with an alkali metal or alkaline earth metal hydroxide. The reaction proceeds smoothly at temperatures of from room temperature to about 100° C. Upon completion of the reaction the desired product may be obtained in conventional manner such as fractional distillation under reduced pressure or the like. Good results are obtained when the hydroxide compound is employed in a molar excess.

The following examples are illustrative of the present invention but are not to be construed as limiting.

Example 1

1375 parts by weight (14.9 moles) of epichlorohydrin were slowly added to 2417 parts by weight (19.5 moles) of 1-ethynylcyclohexanol containing 10 parts by weight of anhydrous stannic chloride with stirring and cooling to maintain the temperature between 50° C. and 65° C. Upon completion of the addition, stirring was continued for 1 hour. Thereafter the reaction mixture containing 2-hydroxy-3-chloropropyl ether of 1-ethynylcyclohexanol was admixed with 800 parts by weight (20 moles) of sodium hydroxide as a 50 percent solution. Upon completion of the reaction, the reaction mixture separated into an aqueous layer and an organic layer. The oil layer was washed with water and fractionally distilled under reduced pressure, to obtain 1300 parts by weight of 1,2-epoxy-3-(1-ethynylcyclohexyloxy)propane product boiling at 70° C. at 0.5 mm. pressure.

Example 2

1375 parts by weight (14.9 moles) of epichlorohydrin were slowly added to 1680 parts by weight (20.0 moles) of 1-methyl-2-butyn-1-ol containing 10 parts by weight of anhydrous stannic chloride with stirring and external cooling to maintain the temperature between 50° C. and 65° C. Upon completion of the addition, stirring was continued for 1 hour. Thereafter the reaction mixture containing 2-hydroxy-3-chloropropyl ether of 1,1-dimethylpropynyl alcohol was admixed with 800 parts by weight (20 moles) of sodium hydroxide as a 50 percent solution. Upon completion of the reaction, the reaction mixture separated into an aqueous layer and an organic layer. The oil layer was washed with water and fractionally distilled under reduced pressure, to obtain 86.3 parts by weight of a 1-(1,1-dimethyl propynyloxy)2,3-epoxypropane product boiling at 102° C. at 63 mm. pressure.

Example 3

1375 parts by weight (14.9 moles) of epichlorohydrin were slowly added to 1700 parts by weight (13.5 moles) of 3,5-dimethyl-1-hexyn-3-ol containing 10 parts by weight of anhydrous stannic chloride in the manner of Example 1 and the reaction carried out at a temperature between 50° C. and 65° C. Upon completion of the addition, stirring was continued for 1 hour. Thereafter the reaction mixture containing 2-hydroxy-3-chloropropyl ether of 1-isobutyl-1-methylpropynyl alcohol was admixed with 800 parts by weight (20 moles) of sodium hydroxide in a 50 percent solution. Upon completion of the reaction, the reaction mixture separated into an aqueous layer and an organic layer. The oil layer was washed with water and fractionally distilled under reduced pressure, to obtain 786 parts by weight of 1,2-epoxy-3-(1-isobutyl-1-methylpropynyloxy) propane product boiling at 70° C. at 0.8 mm. pressure.

Example 4

2200 parts by weight (24 moles) of epichlorohydrin were slowly added to 1900 parts by weight (34.0 moles) of propargyl alcohol containing 10 parts by weight of anhydrous stannic chloride with stirring and external cooling to maintain the temperature between 50° C. and 65° C. Upon completion of the addition, stirring was continued for 1 hour. Thereafter the reaction mixture containing 1-hydroxy-3-chloropropyl ether of propargyl alcohol was admixed with 1160 parts by weight (20 moles) of sodium hydroxide as a 50 percent solution. Upon completion of the reaction, the reaction mixture separated into an aqueous layer and an organic layer. The oil layer was washed with water and fractionally distilled under reduced pressure, to obtain 1199 parts by weight of 1,2-epoxy-3-propargyloxypropane product boiling at 30° C. at 1.0 mm. pressure.

It is thus apparent that any ethynyl aliphatic alcohol may be reacted with epichlorohydrin and the resulting product converted to the epoxy compound by treatment in accordance with the present invention. Thus, for example, compounds such as 1,2-epoxy-3-(pentynyloxy) propane, 1,2-epoxy-3-(hexynyloxy)propane, 1,2-epoxy-3-(heptynyloxy)propane, and the like may be prepared in the manner hereinbefore described.

The products of the present invention have been tested and found to be effective as the active constituent of compositions useful for the control of undesirable vegetation. For such use the compounds may be dispersed on a finely divided carrier and employed as dusts. The new compounds may also be employed in oils, or as constituents in water emulsions or water dispersions with or without a wetting, dispersing or emulsifying agent. In a representative operation aqueous dispersions of the active ingredient gave complete control of a *Raphanus sativus* and *Gossypium Spp.* at a concentration of 2.0 pounds per acre. Further, the compounds are useful as corrosion inhibitors in compositions wherein acid or acid conditions develop with attendant attack on metallic parts. For the latter purpose, concentrations of about 0.01 to 1.0 percent are generally effective.

We claim:

1. A 2,3-epoxypropyl ether of an acetylenic alcohol having the formula 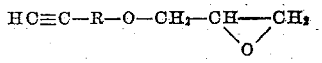 wherein R represents a divalent saturated hydrocarbon radical having from 1 to 8 carbon atoms, inclusive, six of which may be joined together to form a ring.

2. 1,2-epoxy-3-(1-ethynylcyclohexyloxy) propane.

3. 1-(1,1-dimethyl propynyloxy)2,3-epoxypropane.

4. 1,2-epoxy-3-(1-isobutyl-1-methylpropynyloxy) propane.

5. 1,2-epoxy-3-propargyloxypropane.

References Cited in the file of this patent

UNITED STATES PATENTS

| | | |
|---|---|---|
| 2,314,039 | Evans et al. | Mar. 16, 1943 |
| 2,562,897 | Ellingboe | Aug. 7, 1951 |

FOREIGN PATENTS

| | | |
|---|---|---|
| 660,377 | Great Britain | Nov. 7, 1951 |

OTHER REFERENCES

Haynes et al.: J. Chem. Soc., part III, pages 1583–85 (1947) (Abstracted in C.A. 42: 8775d).

UNITED STATES PATENT OFFICE
CERTIFICATE OF CORRECTION

Patent No. 2,986,569                                               May 30, 1961

Roger F. Monroe et al.

It is hereby certified that error appears in the above numbered patent requiring correction and that the said Letters Patent should read as corrected below.

Column 1, line 64, for "1-methyl-2-butyn-1-ol" read -- 2-methyl-3-butyn-2-ol --.

Signed and sealed this 6th day of February 1962.

(SEAL)
ttest:

RNEST W. SWIDER                                        DAVID L. LADD
testing Officer                                               Commissioner of Patents